No. 870,535. PATENTED NOV. 12, 1907.
E. BAUSCH.
PROJECTION APPARATUS.
APPLICATION FILED APR. 25, 1907.
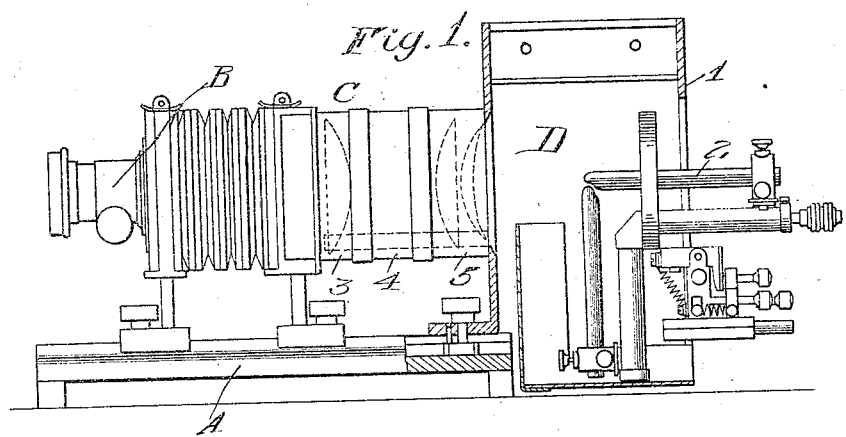
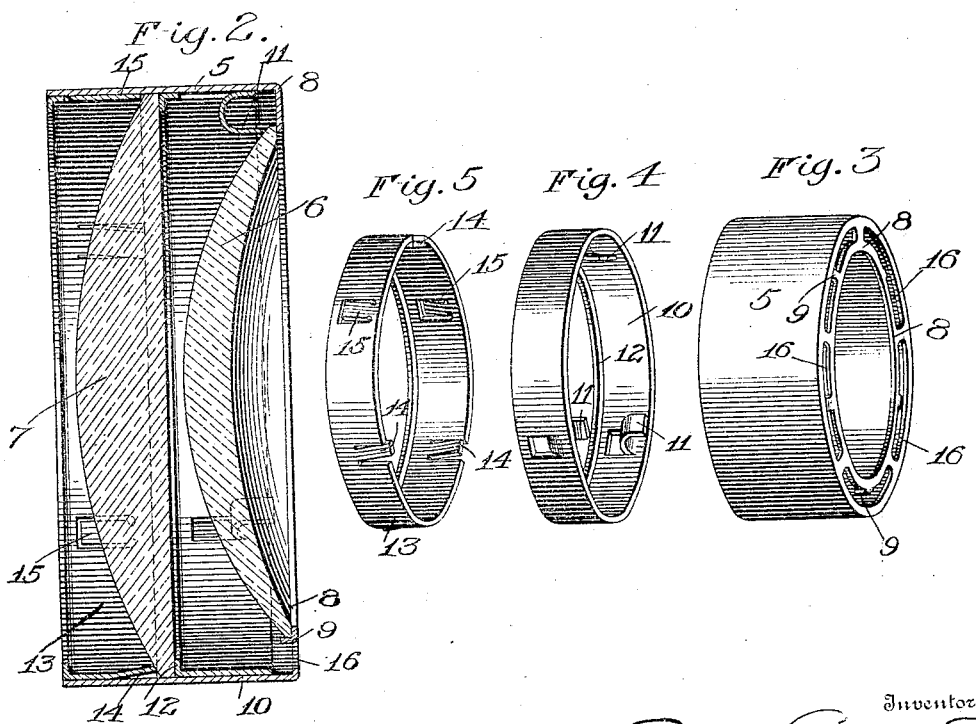
Witnesses
Walter B. Payne.
H. T. Simms
Inventor
Edward Bausch
By Church & Rich
Attorneys

UNITED STATES PATENT OFFICE.

EDWARD BAUSCH, OF ROCHESTER, NEW YORK, ASSIGNOR TO BAUSCH & LOMB OPTICAL COMPANY, OF ROCHESTER, NEW YORK, A CORPORATION OF NEW YORK.

PROJECTION APPARATUS.

No. 870,535.  Specification of Letters Patent.  Patented Nov. 12, 1907.

Application filed April 25, 1907. Serial No. 370,200.

*To all whom it may concern:*

Be it known that I, EDWARD BAUSCH, of Rochester, in the county of Monroe and State of New York, have invented certain new and useful Improvements in Projection Apparatus; and I do hereby declare the following to be a full, clear, and exact description of the same, reference being had to the accompanying drawings, forming a part of this specification, and to the reference-numerals marked thereon.

My present invention relates to improvements in apparatus adapted to project enlarged images of various objects or view slides onto a suitable screen, and for use in connection with lectures or other illustrative purposes. In this type of apparatus, there is employed an illuminator, the light rays from which pass through a condensing lens system to and through the projection device, and the object of the invention is to provide an improved means for ventilating the space in front of the rear lens of the system, so as to cool the rear lens.

A further object is to provide a lens element in which the lenses may be readily removed and replaced in order to facilitate cleaning, or for other purposes.

With these and other objects in view, the invention consists of the parts and combinations of parts illustrated in the accompanying drawings, described in the specification, and more particularly pointed out in the appended claims.

In the drawings: Figure 1 is a side elevation, partly in section, of a projection apparatus to which the invention is shown applied. Fig. 2 is an axial section through the rear lens-element of the condensing lens system, and Figs. 3, 4 and 5 are detail perspective views of the tube and its two lens-retaining rings, respectively.

Referring more particularly to the drawings, A indicates a base or optical bench of a projection apparatus, on which bench is adjustably mounted, in any suitable manner, a suitable projection device B connected by a condensing lens system C to an illuminator D.

The illuminator D is in the form of a casing or hood 1 having suitably supported therein a lamp 2 of any suitable type. The condensing lens system C, herein shown, comprises a front lens-element 3 of any suitable form, a rear lens-element and a water chamber 4 interposed between the front lens-element and the rear lens-element.

The rear lens-element is connected to the casing 1 of the illuminator D and embodies a tubular member 5 having a plurality of lenses 6 and 7 arranged therein, those shown being respectively, a meniscus, and a plano-convex lens. To support the lenses within the tube, the rear end of the latter is provided with an annular inturned flange 8 formed with seats for the rear or meniscus lens 6, these seats being made by stamping projections or fingers 9 from the metal of the flange.

To hold the meniscus lens 6 to its seat 9 while permitting it to be easily removed, there is provided a retaining ring 10 which tightly and slidingly fits the inner wall of the tube and has struck up therefrom, fingers 11 adapted to engage the convex face of the lens 6, and being preferably three in number in order that they may automatically center the lens without requiring attention from the manipulator. This retaining ring 10 acts as a spacing member for the lenses, and carries a seat 12 for the other or plano-convex lens 7, said seat being preferably in the form of an annular inwardly-turned flange on the front end of the retaining ring. The plano-convex lens is held on its seat by a second retaining-ring 13 which engages the said plano-convex lens near the periphery, and in addition is provided with fingers 14 struck up therefrom and sprung inwardly into engagement with the convex face of said lens 7. To hold this latter retaining-ring 13 within the tube there are provided friction devices or spring fingers 15 also struck up from the said retaining-ring, and sprung outwardly to frictionally engage the inner wall of the tube 5. The retaining ring 10 is of such thickness that it does not interfere with the passage of heated air through the openings 16, hereinafter described.

It will be noted that the manner in which the lenses of the rear lens element are secured in place, permits the lenses to be readily removed, cleaned and replaced, and that the structure for accomplishing this result is simple and yet effective.

Another important feature of this invention is the provision of arcuate slots 16 or other openings in the flange that supports the rear or meniscus lens. These slots establish communication between the space in front of the rear lens and the casing of the illuminator and permit the escape of heated air from said space, thus maintaining the rear lens in a cooled state.

Having thus described the invention what I claim is:

1. In a condensing lens system, a lens element comprising a tube having an inwardly-extending flange adapted to engage a lens, and a retaining ring slidingly fitting within said tube and having means to engage the lens to hold the latter to the flange.

2. In a condensing lens system for projection apparatus, a lens element comprising a tube, having a lens seat formed therein, a retaining ring fitted within said tube, adapted to engage a lens on the seat and provided with a lens-seat, and a retaining ring for a lens held on the latter lens-seat.

3. In a condensing lens system, a lens element comprising a lens tube, a lens seat in said tube, a lens for the seat, a ring having means to engage the lens on the seat, a second lens seated against the ring, and a ring holding the latter lens in place and provided with friction devices to engage the wall of the tube.

4. In a condensing lens system, a lens element comprising a lens tube having an inwardly-extending flange, and a retaining ring having inwardly-extending fingers to center the lens on the flange.

5. In a condensing lens system, a lens element comprising a lens tube having a lens seat therein, and a retaining ring having spaced devices to center the lens on its seat.

6. In a condensing lens-system, a lens element comprising a tube, an inwardly-extending flange arranged within the tube and having openings, a lens seated on the flange and surrounded by the openings, and a retaining device for the lens.

7. In a condensing lens-system, a lens element comprising a tube, an inwardly-extending flange arranged within the tube and having openings, a lens seated on the flange and surrounded by the openings, and a retaining device for the lens, said device comprising a ring fitting within the tube and having inwardly-extending fingers engaging the lens.

8. In a condensing lens-system, a tube, a lens seated in the tube, and a retaining ring having fingers frictionally engaging the inner wall of the tube.

9. In a condensing lens system for projection apparatus, a lens element comprising a tube, and a pair of lenses supported in said tube, the support for one of said lenses comprising an annular flange provided with openings.

10. In a condensing lens system, a lens tube having an inwardly-extending annular flange provided with openings, and a lens seated on the flange and surrounded by the openings.

EDWARD BAUSCH.

Witnesses:
C. M. WAGNER,
W. G. WOODWORTH.